US010298120B2

(12) United States Patent
Murata

(10) Patent No.: US 10,298,120 B2
(45) Date of Patent: May 21, 2019

(54) CHARGE PUMP CIRCUIT AND BOOSTING CIRCUIT

(71) Applicant: LAPIS SEMICONDUCTOR CO., LTD., Kanagawa (JP)

(72) Inventor: Nobukazu Murata, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 15/838,030

(22) Filed: Dec. 11, 2017

(65) Prior Publication Data

US 2018/0166985 A1 Jun. 14, 2018

(30) Foreign Application Priority Data

Dec. 13, 2016 (JP) ................................ 2016-241370

(51) Int. Cl.
*H02M 3/07* (2006.01)
*H02M 1/32* (2007.01)

(52) U.S. Cl.
CPC .............. *H02M 3/07* (2013.01); *H02M 1/32* (2013.01); *H02M 3/073* (2013.01)

(58) Field of Classification Search
CPC .. H02M 3/07; H02M 3/073; H02M 2003/071; H02M 2003/072; H02M 2003/075–2003/077
See application file for complete search history.

(56) References Cited

U.S. PATENT DOCUMENTS 5,687,116 A * 11/1997 Kowshik ................ G11C 16/12 365/185.03
6,259,612 B1 * 7/2001 Itoh ........................ H02M 3/07 327/536
6,411,069 B1 * 6/2002 Hollmer ................ G11C 5/145 323/283
6,717,459 B2 * 4/2004 Blodgett .............. H02M 3/073 327/536
2006/0202741 A1 * 9/2006 Tran ........................ H02M 1/36 327/536
2008/0042733 A1 * 2/2008 Fu .......................... H02M 3/07 327/538

(Continued)

FOREIGN PATENT DOCUMENTS

JP H04162560 A 6/1992
JP 2008113269 A 5/2008
JP 2010279089 A 12/2010

*Primary Examiner* — Thomas J. Hiltunen
(74) *Attorney, Agent, or Firm* — Volentine, Whitt & Francos, PLLC

(57) ABSTRACT

A charge pump circuit includes a first capacitor and a second capacitor to which respective pulse signals are input; a first transistor including a source connected to a voltage input terminal, a drain connected to the first capacitor and a gate connected to the second capacitor; a second transistor including a source connected to the voltage input terminal, a drain connected to the second capacitor and a gate connected to the first capacitor; and a potential fixing circuit provided between a first node that is a connection node of the first transistor and the first capacitor, and a second node that is a connection node of the second transistor and the second capacitor. The potential fixing circuit fixes a potential of the first node to a potential according to a potential of the second node.

5 Claims, 14 Drawing Sheets

(56) References Cited

U.S. PATENT DOCUMENTS

| | | | | |
|---|---|---|---|---|
| 2009/0184753 | A1* | 7/2009 | Kawashima .......... | H02M 3/073<br>327/536 |
| 2011/0068857 | A1* | 3/2011 | Ucciardello .......... | H02M 3/073<br>327/536 |
| 2013/0069711 | A1* | 3/2013 | Chen ....................... | H02M 3/07<br>327/536 |
| 2014/0097887 | A1* | 4/2014 | Aebischer ............... | H02M 3/00<br>327/536 |
| 2017/0288532 | A1* | 10/2017 | Zhou ....................... | H02M 3/07 |

* cited by examiner 100
102
30
31
32
VD
Vref
40
103
20
DISCHARGE CIRCUIT
S1
VPP
VPIA
VPIB
VPIC
VCC
ENB
BOOSTING SECTION
10
CONTROL CIRCUIT
50
ENB
C2B
C1B
C2A
C1A
101
VCC 10
102
103
VPP
VPIn
11 (11-n)
VIN
VOUT
VPI
C1
C2
11 (11-3)
VPO3
VPI3
11 (11-2)
VPO2
VPI2
11 (11-1)
VPO1
VPI1
C1A
C2A
C1B
C2B
ENB
12
101
VCC

CHARGE PUMP CIRCUIT AND BOOSTING CIRCUIT

CROSS-REFERENCE TO RELATED APPLICATION

This application claims priority under 35 USC 119 from Japanese Patent Application No. 2016-241370, filed on Dec. 13, 2016, the disclosure of which is incorporated by reference herein.

BACKGROUND

Technical Field

The present disclosure relates to a charge pump circuit and a boosting circuit.

Related Art

In technology related to a boosting circuit including a charge pump circuit, the following technology is known. For example, Japanese Patent Application Laid-Open (JP-A) No. H04-162560 discloses a boosting circuit that includes a voltage dividing circuit that divides the voltage of an output voltage of a charge pump circuit using resistor elements, an error amplifier that amplifies an error voltage obtained by comparing a voltage divided by the voltage dividing circuit with a reference voltage, and a voltage-controlled oscillator (VCO) that outputs a switching signal of the charge pump circuit as a voltage to control output of the error amplifier.

Further, JP-A No. 2010-279089 discloses a boosting circuit including a first transistor connected to a first node, a first capacitor element that has a first end connected to the first node and that is charged with the voltage of the first node in a case in which the first transistor is activated, and a first control signal generation circuit that outputs a first control signal to a control terminal of the first transistor. In this boosting circuit, in a case in which the first transistor is not activated, the first capacitor element boosts the potential of the first node to a second voltage by a voltage not exceeding ½ a first power source voltage being applied to the other end of the first capacitor element. In the first control signal generation circuit, the potential of the first control signal in a case in which the first transistor is not activated is a second potential. The second potential is a potential such that the difference between the potential of the first control signal when the first transistor is activated and the second potential is within the first power source voltage.

In JP-A No. 2008-113269, a charge pump circuit is described that includes plural charge transmission elements connected together in series between an input terminal and an output terminal, plural capacitor elements each having one terminal connected to a respective connection point of the plural charge transmission elements and another terminal applied with a clock signal, a step-down circuit that steps down a voltage of the output terminal in a case in which application of the clock signal has stopped, and a step-down rectifier element connected between the connection point and the output terminal.

According to the boosting circuit of JP-A No. H04-162560, the voltage dividing circuit that divides the output voltage of the charge pump circuit is configured by plural resistor elements connected together in series. However, the consumed current may increase by the voltage dividing circuit configured by the plural resistor elements.

On the other hand, in a boosting circuit, a withstand voltage of transistors configuring the boosting circuit needs to be considered. In particular, the withstand voltage of gate oxide films is important, and a circuit configuration needs to be employed such that potential differences between gates and sources and between gate and drains do not exceed the withstand voltages. Generally, in a boosting circuit, circuit blocks applied with a high voltage generated by boosting are configured including high withstand voltage transistors, and other circuit blocks are configured by low withstand voltage transistors. However, high withstand voltage transistors have a different structure to low withstand voltage transistors. In particular, the film thickness of gate oxide film for high withstand voltage transistors is thicker than that for low withstand voltage transistors, with a consequent increase in the number of masks and the number of process employed in the manufacturing processes for high withstand voltage transistors compared to those for low withstand voltage transistors. Thus, the manufacturing cost becomes higher in cases in which a boosting circuit includes a high withstand voltage transistor.

SUMMARY

The present disclosure provides a charge pump circuit and a boosting circuit that may be configured without employing a high withstand voltage transistor, and that may realize a low power consumption.

A first aspect of the present disclosure is a charge pump circuit including: a first capacitor and a second capacitor to which pulse signal are input; a first transistor including a source connected to a voltage input terminal and a drain connected to the first capacitor, or a source connected to the first capacitor and a drain connected to the voltage input terminal, and a gate connected to the second capacitor; a second transistor including a source connected to the voltage input terminal and a drain connected to the second capacitor, or a source connected to the second capacitor and a drain connected to the voltage input terminal, and a gate connected to the first capacitor; and a potential fixing circuit provided between a first node that is a connection node of the first transistor and the first capacitor, and a second node that is a connection node of the second transistor and the second capacitor, the potential fixing circuit fixing a potential of the first node to a potential according to a potential of the second node.

A second aspect of the present disclosure is a boosting circuit including plural charge pump circuits in which a voltage output terminal of a prior stage charge pump circuit is connected to a voltage input terminal of a next stage charge pump circuit, each of the plural charge pump circuits including: a first capacitor and a second capacitor to which pulse signal are input; a first transistor including a source connected to a voltage input terminal and a drain connected to the first capacitor, or a source connected to the first capacitor and a drain connected to the voltage input terminal, and a gate connected to the second capacitor; a second transistor including a source connected to the voltage input terminal and a drain connected to the second capacitor, or a source connected to the second capacitor and a drain connected to the voltage input terminal, and a gate connected to the first capacitor; and a potential fixing circuit provided between a first node that is a connection node of the first transistor and the first capacitor, and a second node that is a connection node of the second transistor and the second capacitor, the potential fixing circuit fixing a potential of the first node to a potential according to a potential of the second node, wherein the voltage output terminal connected to the second node.

According to the above aspects, the present disclosure may provide a charge pump circuit and a boosting circuit that may be configured without employing a high withstand voltage transistor, and that may realize a low power consumption.

BRIEF DESCRIPTION OF THE DRAWINGS

Exemplary embodiments will be described in detail based on the following figures, wherein.

DETAILED DESCRIPTION

Explanation follows regarding exemplary embodiments of the present disclosure, with reference to the drawings. Note that substantially the same or equivalent configuration elements and parts are appended with the same reference signs in each of the drawings.

First Exemplary Embodiment

Figure 1:
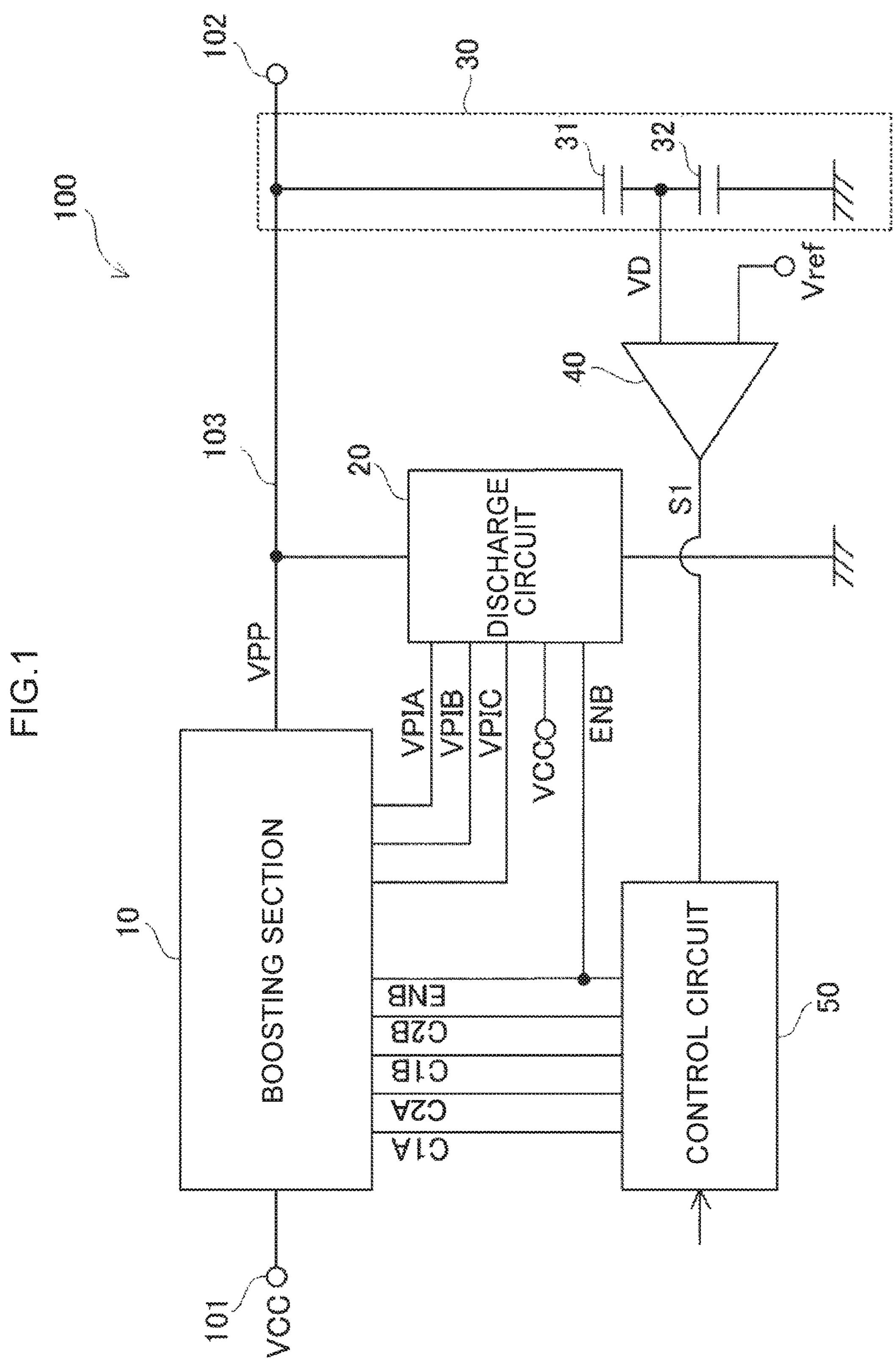
FIG. 1 is a circuit block diagram illustrating a configuration of a boosting circuit according to an exemplary embodiment of the present disclosure.

FIG. 1 is a circuit block diagram illustrating configuration of a boosting circuit 100 according to an exemplary embodiment of the present disclosure. The boosting circuit 100 boosts a voltage VCC input to an input terminal 101, and outputs a boosted voltage VPP from an output terminal 102. The boosting circuit 100 is configured including a boosting section 10, a discharge circuit 20, a voltage dividing circuit 30, a comparator 40, and a control circuit 50.

The boosting section 10 is configured including plural charge pump circuits that are multistage connected. The boosting section 10 boosts the voltage VCC input to the input terminal 101 to the voltage VPP of higher voltage level than the voltage VCC, and outputs the voltage VPP to an output line 103 connected to the output terminal 102. Note that, in the present exemplary embodiment, the voltage VCC is a voltage level permissible for low withstand voltage transistors, and is employed as the power source voltage for the comparator 40 and the control circuit 50.

The voltage dividing circuit 30 is provided between the output line 103 and a ground line, and is configured including capacitors 31 and 32 that are connected together in series. One electrode of the capacitor 31 is connected to the output line 103, and another electrode thereof is connected to one electrode of the capacitor 32. Another electrode of the capacitor 32 is connected to the ground line. The voltage dividing circuit 30 divides the voltage VPP output to the output line 103, and supplies a divided voltage VD to the comparator 40. The voltage dividing ratio of the voltage dividing circuit 30 is determined by the ratio of the capacitances of the capacitors 31 and 32.

The comparator 40 outputs a signal S1 indicating a result of a comparison between the voltage VD output from the voltage dividing circuit 30 and a reference voltage Vref. The comparator 40, for example, outputs the signal S1 with high level in a case in which the voltage VD is greater than the reference voltage Vref, and outputs the signal S1 with low level in a case in which the voltage VD is less than the reference voltage Vref. The signal S1 is supplied to the control circuit 50.

The control circuit 50 supplies pulse signals C1A, C2A, C1B, C2B to the boosting section 10 while the signal S1 supplied from the comparator 40 is in low level. In a case in which the control circuit 50 determines that the voltage VPP output from the boosting section 10 has reached a predetermined level due to the signal S1 supplied from the comparator 40 being high level, the control circuit 50 stops supplying the pulse signals C1A, C2A, C1B, C2B to the boosting section 10. Based on an externally supplied command, the control circuit 50 supplies an enable signal ENB with low level to the boosting section 10, and the discharge circuit 20 enables the functionality of the boosting section 10. The boosting section 10 is able to perform a boosting operation based on the pulse signals C1A, C2A, C1B, C2B while the boosting section 10 is being supplied with the enable signal ENB with low level. The discharge circuit 20 stops a discharge operation in a case in which the enable signal ENB with low level is supplied thereto. Based on an externally supplied command, the control circuit 50 supplies the enable signal ENB with high level to the boosting section 10, and the discharge circuit 20 disables the functionality of the boosting section 10. The boosting section 10 stops the boosting operation and performs the discharge operation while the boosting section 10 is being supplied with the enable signal ENB with high level.

In a case in which the enable signal ENB with high level is supplied from the control circuit 50, the discharge circuit 20 performs the discharge operation to discharge charge accumulated in the capacitors 31 and 32 configuring the voltage dividing circuit 30. Internal voltages arising within the boosting section 10 and the voltage VCC are supplied to the discharge circuit 20 as control voltages VPIA, VPIB, and VPIC to control terminal voltages of plural transistors configuring the discharge circuit 20.

Figure 2:
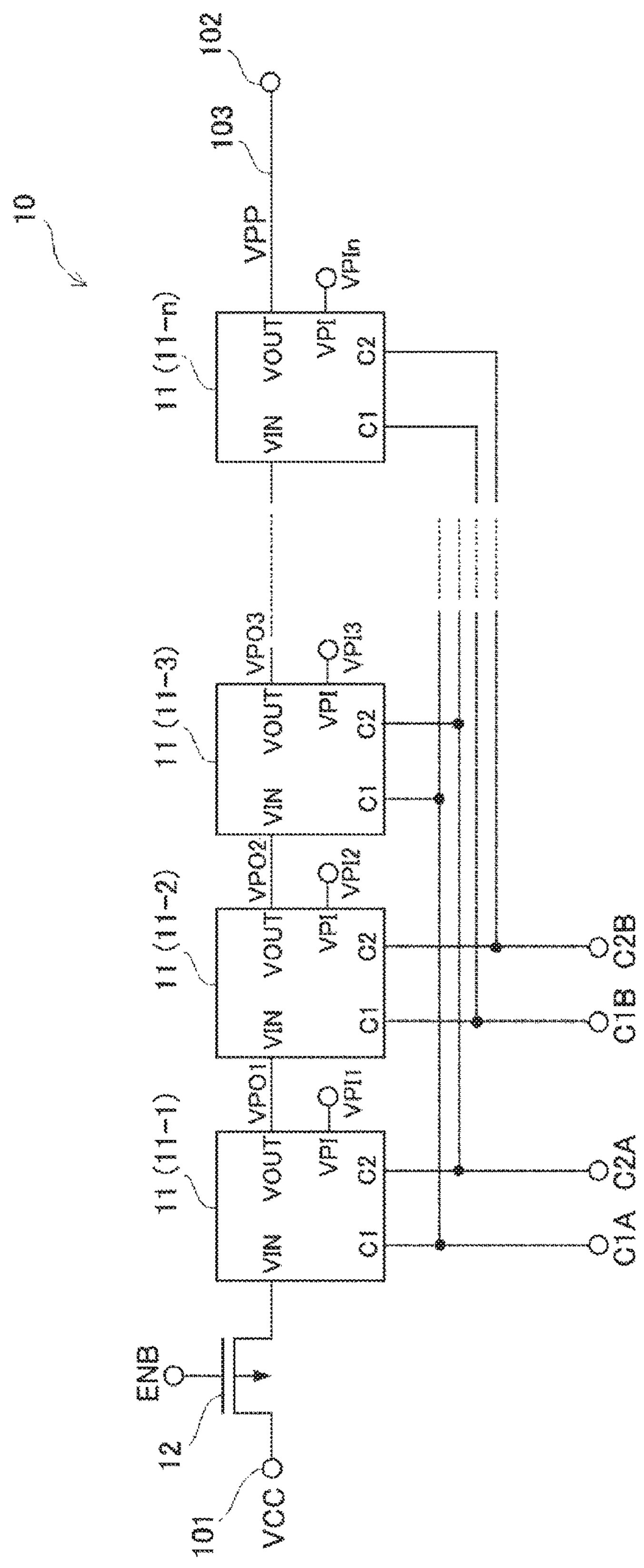
FIG. 2 is a block diagram illustrating a detailed configuration of a boosting section according to an exemplary embodiment of the present disclosure.

FIG. 2 is a block diagram illustrating a detailed configuration of the boosting section 10. The boosting section 10 is configured including plural charge pump circuits 11-1, 11-2, 11-3, . . . , 11-n that are multistage connected, and a p-channel metal-oxide-semiconductor field-effect transistor (MOSFET) 12. The charge pump circuits 11-1, 11-2, 11-3, . . . , 11-n each have the same configuration as each other. In the following, in a case in which not discriminating between the respective charge pump circuits 11-1, 11-2, 11-3, . . . , 11-n, or in a case in which referring to them collectively, they are referred to as "charge pump circuit(s) 11".

The charge pump circuits 11 each include signal input terminals C1, C2, a voltage input terminal VIN, a voltage output terminal VOUT, and an internal voltage output terminal VPI. In a case in which the signal input terminals C1, C2 including the pulse signals C1A and C2A having mutually different phase or the pulse signals C1B and C2B having mutually different phase, are supplied to the charge pump circuits 11, the charge pump circuits 11 boost the voltage input to the voltage input terminal VIN, and output the boosted voltage from the voltage output terminal VOUT. In the boosting section 10, the voltage output terminal VOUT of a prior stage charge pump circuit 11 is connected to the voltage input terminal VIN of a next stage charge pump circuit 11.

Namely, the first stage charge pump circuit 11-1 boosts the voltage VCC that is input via the MOSFET 12 to its voltage input terminal VIN, and outputs a boosted voltage VPO1 (>VCC) from its voltage output terminal VOUT, and supplies this output voltage to the next stage charge pump circuit 11-2. The charge pump circuit 11-2 boosts the voltage VPO1 input to its voltage input terminal VIN, outputs a boosted voltage VPO2 (>VPO1) from its voltage output terminal VOUT, and supplies this output voltage to the next stage charge pump circuit 11-3. The charge pump circuit 11-3 boosts the voltage VPO2 input to its voltage input terminal VIN, outputs a boosted voltage VPO3 (>VPO2) from its voltage output terminal VOUT, and supplies this output voltage to the next stage charge pump circuit (not illustrated in the drawings). The final stage charge pump circuit 11-n boosts the voltage input to its voltage input terminal VIN, and outputs this boosted voltage as the final output voltage VPP of the boosting section 10 to the output line 103. Thus, due to the boosting section 10 having a multistage configuration from plural charge pump circuits 11, the boosting section 10 is able to generate an output voltage of higher voltage level than the output voltage obtainable by a single unit charge pump circuit 11.

In the present exemplary embodiment, the charge pump circuits 11 that are input with the signal pair formed from the pulse signals C1A and C2A are disposed alternately with the charge pump circuits 11 input with the signal pair formed from the pulse signals C1B and C2B. In the example illustrated in FIG. 2, the charge pump circuits 11-1 and 11-3 with odd number positions in the array sequence are input with the signal pair formed from the pulse signals C1A and C2A, and the charge pump circuits 11-2 and 11-n with even number positions in the array sequence are input with the signal pair formed from the pulse signals C1B and C2B.

In the present exemplary embodiment, three out of internal voltages VPI1, VPI2, VPI3, . . . , VPIn output from the respective internal voltage output terminals VPI of the charge pump circuits 11-1, 11-2, 11-3, . . . , 11-n are supplied to the discharge circuit 20 as the control voltages VPIA, VPIB, and VPIC.

The source of the p-channel MOSFET 12 is connected to the input terminal 101 of the boosting circuit 100, the drain thereof is connected to the voltage input terminal VIN of the first stage charge pump circuit 11-1, and the gate thereof is connected to the control circuit 50. The MOSFET 12 becomes an ON state in a case in which its gate is supplied with the enable signal ENB with low level from the control circuit 50. The voltage VCC is thereby supplied to the voltage input terminal VIN of the first stage charge pump circuit 11-1.

Figure 3:
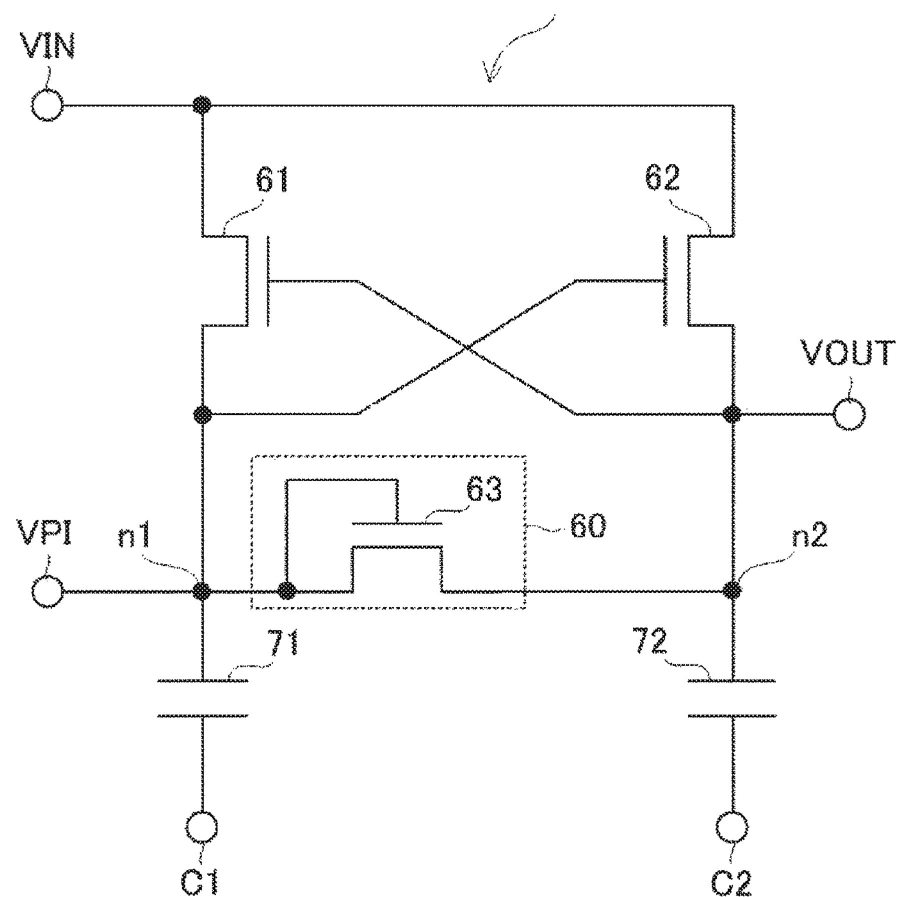
FIG. 3 is a circuit diagram illustrating a detailed configuration of a charge pump circuit according to an exemplary embodiment of the present disclosure.

FIG. 3 is a circuit diagram illustrating a detailed configuration of one of the charge pump circuits 11. The charge pump circuit 11 is configured including n-channel MOSFETs 61, 62, and 63, and capacitors 71 and 72.

The drain of the MOSFET 61 is connected to the voltage input terminal VIN, the source thereof is connected to one electrode of the capacitor 71, and the gate thereof is connected to one electrode of the capacitor 72. A connection node between the MOSFET 61 and the capacitor 71 will be referred to as node n1.

The drain of the MOSFET 62 is connected to the voltage input terminal VIN, the source thereof is connected to one electrode of the capacitor 72, and the gate thereof is connected to one electrode of the capacitor 71 (to node n1). The connection node between the MOSFET 62 and the capacitor 72 will be referred to as node n2.

The gate and the drain of the MOSFET 63 are connected to node n1, and the source thereof is connected to node n2. The MOSFET 63 functions as a potential fixing circuit 60 that fixes the potential of node n1 to a potential according to the potential of node n2. Specifically, the potential fixing circuit 60 fixes a potential Vn1 of the node n1 to a potential of a potential Vn2 of the node n2 raised by a gate threshold value voltage VT of the MOSFET 63. Namely, the following Equation (1) holds for the potential Vn1 of the node n1.

$$Vn1 = Vn2 + VT \tag{1}$$

An electrode of the capacitor 71 on the opposite side to the node n1 side is connected to a signal input terminal C1. An electrode on the opposite side of the capacitor 72 to the node n2 side is connected to a signal input terminal C2. During boosting operation, either the pulse signals C1A and C2A or the pulse signals C1B and C2B are input to the capacitors 71 and 72.

The voltage output terminal VOUT is connected to the node n2. The internal voltage output terminal VPI is connected to the node n1. Namely, in the charge pump circuits 11-1, 11-2, 11-3, . . . , 11-n, the voltages arising at respective nodes n1 are output from the respective internal voltage output terminals VPI as the internal voltages VPI1, VPI2, VPI3, . . . , VPIn.

In the present exemplary embodiment, the internal voltage output terminals VPI of three charge pump circuits from out of the charge pump circuits 11-1, 11-2, 11-3, . . . , 11-n are connected to the discharge circuit 20, and three from out of the internal voltages VPI1, VPI2, VPI3, . . . , VPIn are supplied to the discharge circuit 20 as the control voltages VPIA, VPIB, and VPIC.

Figure 4:
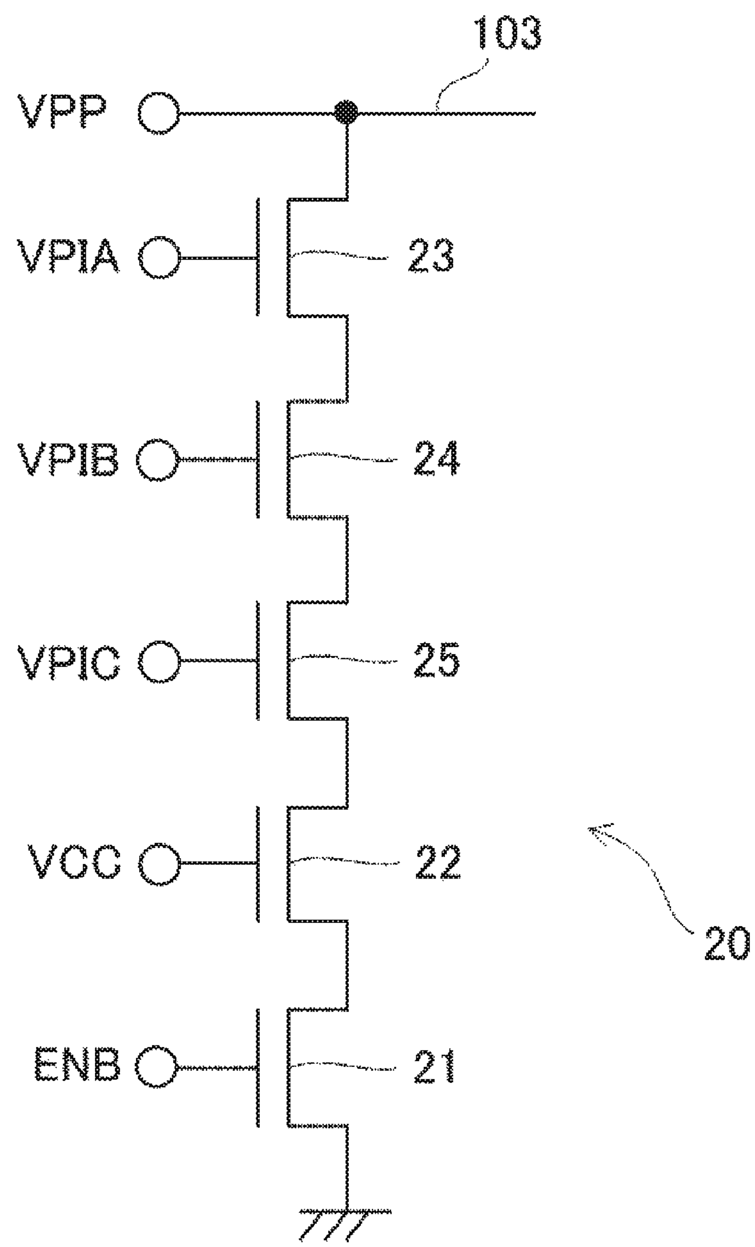
FIG. 4 is a circuit diagram illustrating a detailed configuration of a discharge circuit according to an exemplary embodiment of the present disclosure.

FIG. 4 is a circuit diagram illustrating detailed configuration of the discharge circuit 20. The discharge circuit 20 is provided between the output line 103 of the boosting circuit 100 and the ground line, and is configured including n-channel MOSFETs 21, 22, 23, 24, and 25 that are connected together in series. The drain of the MOSFET 23 disposed furthest to the high potential side is connected to the output line 103, and the source thereof is connected to the drain of the MOSFET 24. The source of the MOSFET 24 is connected to the drain of the MOSFET 25. The source of the MOSFET 25 is connected to the drain of the MOSFET 22. The source of the MOSFET 22 is connected to the drain of the MOSFET 21. The source of the MOSFET 21 is connected to the ground line.

The enable signal ENB output from the control circuit 50 is input to the gate of the MOSFET 21 disposed furthest to the low potential side. The MOSFET 21 becomes an ON state in a case in which the level of the enable signal ENB is high level. Discharge operation is performed in the discharge circuit 20 by the MOSFET 21 in the ON state. The MOSFET 21 functions as a discharge transistor placed in the ON state in a case in which the discharge circuit 20 is performing the discharge operation. To disable the functionality of the boosting section 10, the control circuit 50 makes the level of the enable signal ENB high level to cause the discharge circuit 20 to perform the discharge operation.

The voltage VCC is supplied to the gate of the MOSFET 22. The control voltages VPIA, VPIB, and VPIC are respectively supplied to the gates of the MOSFETs 23, 24, and 25. As described above, the control voltages VPIA, VPIB, and VPIC are three voltages from out of the internal voltages VPI1, VPI2, VPI3, VPIn respectively output from the charge pump circuits 11-1, 11-2, 11-3, . . . , 11-n. The control voltages VPIA, VPIB, and VPIC to be used are selected from the internal voltages VPI1, VPI2, VPI3, . . . , VPIn such that the control voltages VPIA, VPIB, and VPIC satisfy the relationship expressed by Equation (2) below.

$$VCC<VPIC<VPIB<VPIA \quad (2)$$

Namely, for the MOSFETs 23, 24, and 25, the gates of the MOSFETs 23, 24, and 25 are respectively supplied with internal voltages of three mutually different charge pump circuits 11 as the control voltages VPIA, VPIB, and VPIC, such that the gates of the MOSFETs are supplied with voltages higher in sequence down from the MOSFET connected at the high potential side. Note that the relationship expressed by Equation (3) below holds for the internal voltages VPI1, VPI2, VPI3, VPIn during the boosting operation.

$$VPI1<VPI2<VPI3< \ldots <VPIn \quad (3)$$

Due to the gate voltages of the MOSFETs 22 to 25 being respectively supplied as described above, the MOSFETs 22 to 25 configuring the discharge circuit 20 function as voltage relaxation transistors to relax the potential differences between the respective terminals in each of the MOSFETs 21 to 25.

Operation of the boosting circuit 100 will be described below. To enable the functionality of the boosting section 10, the control circuit 50 makes the level of the enable signal ENB low level. The MOSFET 12 of the boosting section 10 thereby becomes ON state, and the voltage VCC is supplied to the voltage input terminal VIN of the first stage charge pump circuit 11-1. Moreover, due to the level of the enable signal ENB being low level, the MOSFET 21 of the discharge circuit 20 becomes OFF state, and discharge operation in the discharge circuit 20 is stopped.

Figure 5:
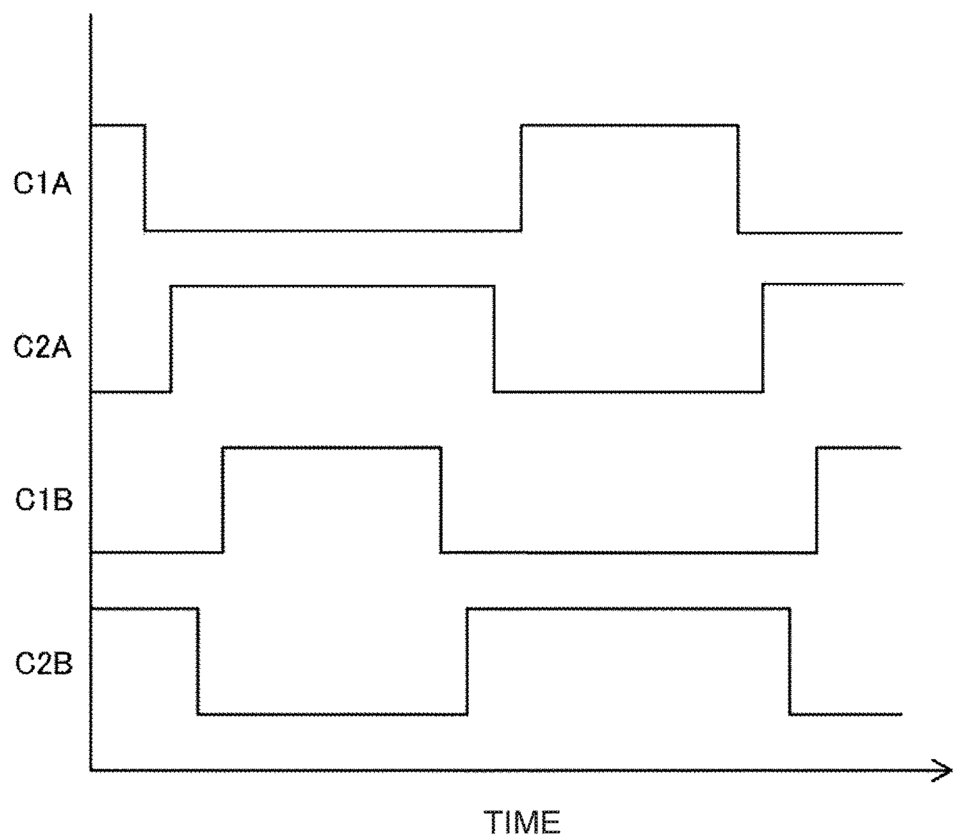
FIG. 5 is an example of a timing chart of pulse signals according to an exemplary embodiment of the present disclosure.

Then, the control circuit 50 supplies the pulse signals C1A, C2A, C1B, C2B to the boosting section 10. FIG. 5 illustrates an example of a timing chart of the pulse signals C1A, C2A, C1B, C2B. In a case in which the pulse signals C1A, C2A, C1B, C2B are supplied to the boosting section 10, the voltage input to the voltage input terminal VIN is boosted in each of the respective charge pump circuits 11, and the boosted voltages are output from the respective voltage output terminals VOUT.

Figure 6:
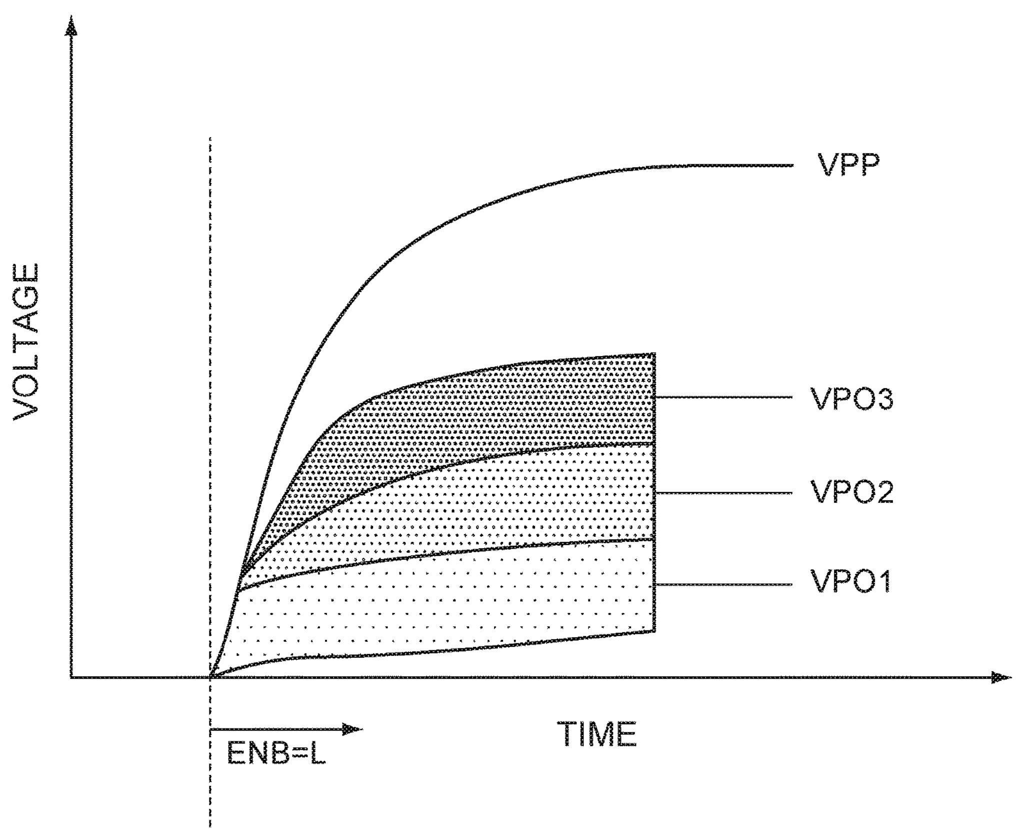
FIG. 6 is a diagram illustrating an example of time-wise transitions arising during boosting operation at voltage output terminals of a charge pump circuit according to an exemplary embodiment of the present disclosure.

FIG. 6 is a diagram illustrating an example of time-wise transitions in the voltages VPO1, VPO2, VPO3, . . . , VPP arising at the voltage output terminals VOUT (nodes n2) of the charge pump circuits 11-1, 11-2, 11-3, . . . , 11-n during the boosting operation. The levels of the voltages VPO1, VPO2, VPO3, . . . , VPP arising at the voltage output terminals VOUT (nodes n2) of the charge pump circuits 11-1, 11-2, 11-3, . . . , 11-n rise the longer the time the pulse signals C1A, C2A, C1B, C2B continue to be supplied for. In a case in which the output voltage VPP output from the final stage charge pump circuit 11-n reaches a predetermined level, the level of the signal S1 output from the comparator 40 becomes high level. The control circuit 50 accordingly stops the boosting operation in the boosting section 10 by stopping the output of the pulse signals C1A, C2A, C1B, C2B. Note that during the boosting operation, the potential of the node n1 and the node n2 of the respective charge pump circuits 11 are substantially the same level, and so the potential difference between the respective terminals of each of the MOSFETs 61, 62, and 63 of the charge pump circuits 11 during boosting operation are of a magnitude permissible for low withstand voltage transistors.

The relationship expressed by above Equation (3) holds for the internal voltages VPI1, VPI2, VPI3, . . . , VPIn of the charge pump circuits 11-1, 11-2, 11-3, . . . , 11-n during boosting operation, and above Equation (2) holds for the control voltages VPIA, VPIB, and VPIC supplied to the discharge circuit 20. The gate-to-drain voltages and the source voltages of the MOSFETs 21 to 25 of the discharge circuit 20 during boosting operation are as described below. Note that the gate threshold value voltages of each of the MOSFETs 21 to 25 are denoted as VT.

The gate-to-drain voltage of the MOSFET 23 is (VPP−VPIA). The source voltage of the MOSFET 23 is smaller than (VPIA−VT) due to the MOSFET 23 maintaining the ON state.

The drain voltage of the MOSFET 24 is the same level as the source voltage of the MOSFET 23, and is smaller than (VPIA−VT). Thus the gate-to-drain voltage of the MOSFET 24 is smaller than (VPIA−VT−VPIB). The source voltage of the MOSFET 24 is smaller than (VPIB−VT) due to the MOSFET 24 maintaining the ON state.

The drain voltage of the MOSFET 25 is the same level as the source voltage of the MOSFET 24, and is smaller than (VPIB−VT). Thus the gate-to-drain voltage of the MOSFET 25 is smaller than (VPIB−VT−VPIC). The source voltage of the MOSFET 25 is smaller than (VPIC−VT) due to the MOSFET 25 maintaining the ON state.

The drain voltage of the MOSFET 22 is the same level as the source voltage of the MOSFET 25, and is smaller than (VPIC−VT). Thus the gate-to-drain voltage of the MOSFET 22 is smaller than (VPIC−VT−VCC). The source voltage of the MOSFET 22 is smaller than (VCC−VT) due the MOSFET 22 maintaining the ON state.

The drain voltage of the MOSFET 21 is the same level as the source voltage of the MOSFET 22, and is smaller than (VCC−VT).

The voltages used as the control voltages VPIA, VPIB, and VPIC are appropriately selected from out of the internal voltages VPI1, VPI2, VPI3, . . . , VPIn of the boosting section 10 such that the gate-to-drain voltage of the MOSFET 23 (VPP−VPIA), the gate-to-drain voltage of the MOSFET 24 (VPIA−VT−VPIB), the gate-to-drain voltage of the MOSFET 25 (VPIB−VT−VPIC), and the gate-to-drain voltage of the MOSFET 22 (VPIC−VT−VCC) are each a respective level permissible for low withstand voltage transistors. This enables each of the MOSFETs 21 to 25 configuring the discharge circuit 20 to be configured by a low withstand voltage transistor.

To disable the functionality of boosting section 10, the control circuit 50 changes the level of the enable signal ENB to high level. The MOSFET 12 of the boosting section 10 thereby becomes OFF state, and supply of the voltage VCC to the first stage charge pump circuit 11-1 is stopped. Moreover, due to the level of the enable signal ENB being high level, the MOSFET 21 of the discharge circuit 20 becomes ON state, and discharge operation is performed in the discharge circuit 20.

Figure 7:
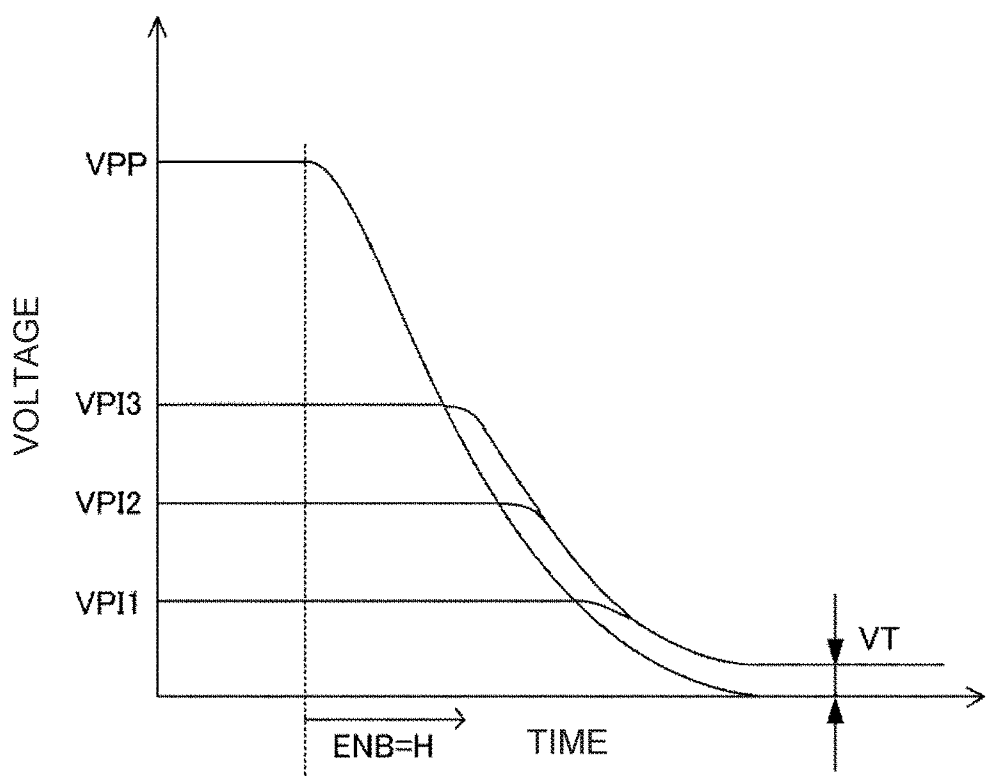
FIG. 7 is a diagram illustrating an example of time-wise transitions of internal voltages during discharge operation in a charge pump circuit according to an exemplary embodiment of the present disclosure.

FIG. 7 is a diagram illustrating an example of time-wise transitions of internal voltages in the charge pump circuit 11 during discharge operation. In a case in which discharge operation is started and the levels of the voltages VPO1, VPO2, VPO3, . . . , VPP arising at the voltage output terminals VOUT (nodes n2) of the charge pump circuits 11-1, 11-2, 11-3, . . . , 11-n drop, the MOSFET 63 that functions as the potential fixing circuit 60 in each of the charge pump circuits 11 becomes ON state. The potential Vn1 at the node n1 is thereby fixed to the potential (Vn2+VT) that is higher than the potential of the potential Vn2 at node n2 by the gate threshold value voltage VT of the MOSFET 63. Thus, in a case in which the discharge operation has started, the internal voltages VPI1, VPI2, VPI3, . . . , VPIn that are the voltages arising at the nodes n1 are maintained in a state higher by the amount of VT than the respective voltages VPO1, VPO2, VPO3, . . . , VPP, which are the voltages arising at the nodes n2, and the internal voltages VPI1, VPI2, VPI3, . . . , VPIn drop accompanying the drop in the voltages VPO1, VPO2, VPO3, . . . , VPP. Thus, during the discharge operation, the potential differences between the respective terminals of each of the MOSFETs 61, 62, and 63, which configure the charge pump circuits 11, become approximately VT, i.e. a magnitude permissible for low withstand voltage transistors.

During the discharge operation, the internal voltages of the charge pump circuits 11 supplied as the control voltages VPIA, VPIB, and VPIC to the respective gates of the MOSFETs 23, 24, and 25 configuring the discharge circuit 20 gradually drop accompanying the discharge operation, as illustrated in FIG. 7. However, the potentials of the nodes n1 of the charge pump circuits 11 are maintained at voltages of VT or greater during the discharge operation, and so the gates of the MOSFETs 23, 24, and 25 configuring the discharge circuit 20 are supplied with voltages of VT or greater during the discharge operation. Thus, due to the MOSFETs 23, 24, and 25 being able to maintain the ON state during the discharge operation, the discharge operation can be performed appropriately in the discharge circuit 20. Moreover, during the discharge operation, the potential differences between the respective terminals of each of the MOSFETs 21 to 25 configuring the discharge circuit 20 are maintained within a range permissible for low withstand voltage transistors.

In this manner, the boosting circuit 100 according to the exemplary embodiment can set the potential differences between the respective terminals of each of the transistors configuring the charge pump circuits 11 and the discharge circuit 20 within a range permissible for low withstand voltage transistors. This thereby enables all of the transistors configuring the boosting circuit 100 to be configured by low withstand voltage transistors such that there is no need to employ high withstand voltage transistors. Thus, due to being able to form all of the MOSFETs configuring the boosting circuit 100 using manufacturing processes for low withstand voltage transistors, an increase in the number of masks and the number of processes can be avoided. Accordingly, the boosting circuit 100 according to the exemplary embodiment may reduce manufacturing cost in comparison to a traditional boosting circuit including high withstand voltage transistors.

The boosting circuit 100 according to the exemplary embodiment includes the voltage dividing circuit 30 configured by capacitors 31 and 32, enabling a reduction in power consumption to be realized, compared to cases in which the voltage dividing circuit 30 is configured by resistor elements.

Figure 8:
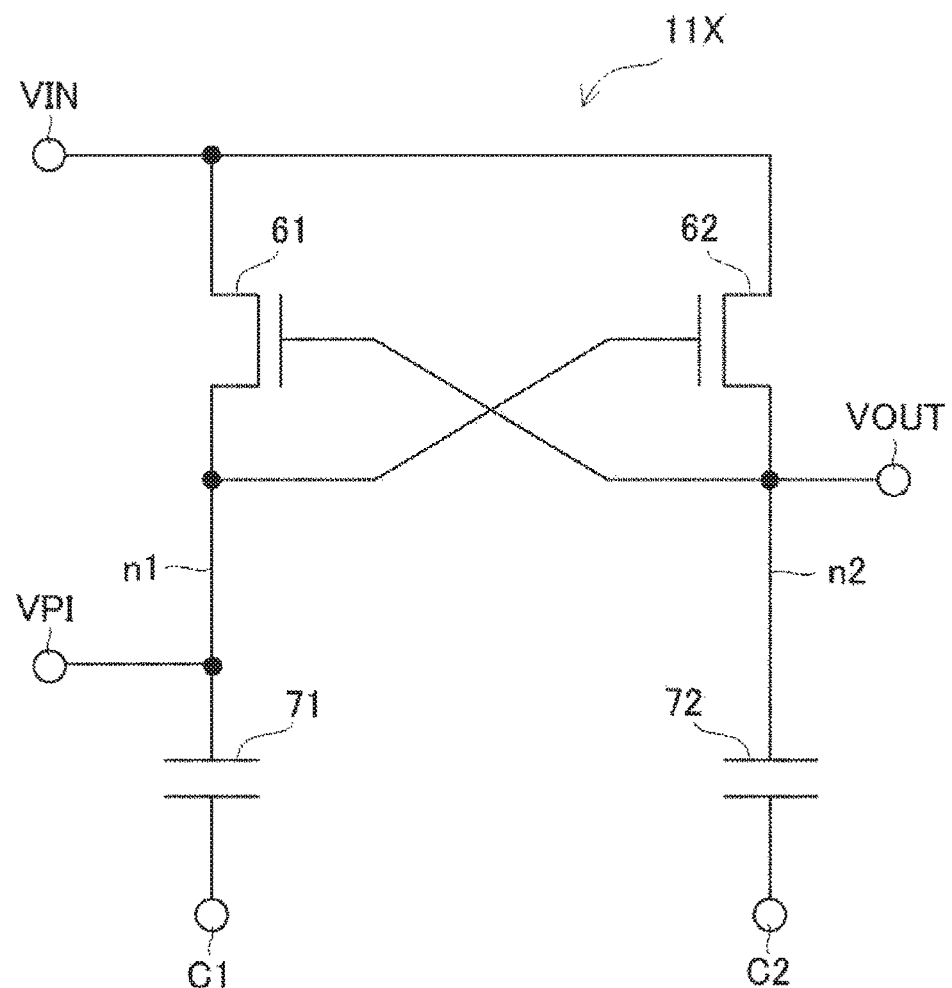
FIG. 8 is a circuit diagram illustrating a configuration of a charge pump circuit according to a comparative example.

FIG. 8 is a circuit diagram illustrating a configuration of a charge pump circuit 11X according to a comparative example. The charge pump circuit 11X according to the comparative example is different from the charge pump circuits 11 according to the exemplary embodiment of the present disclosure in the point that there is no potential fixing circuit included to fix the potential of the node n1.

In cases in which the charge pump circuits 11X according to the comparative example are employed to configure a boosting circuit, instead of employing the charge pump circuits 11 according to the exemplary embodiment of the present disclosure, the time-wise transitions in the levels of the voltages VPO1, VPO2, VPO3, . . . , VPP arising at the voltage output terminals VOUT of each of the charge pump circuits 11X during the discharge operation are similar to those of the boosting circuit 100 according to the exemplary embodiment of the present disclosure. Namely, in the boosting circuit according to the comparative example, the potentials of the nodes n2 of each of the charge pump circuits 11X drop to ground level due to the discharge operation.

Figure 9:
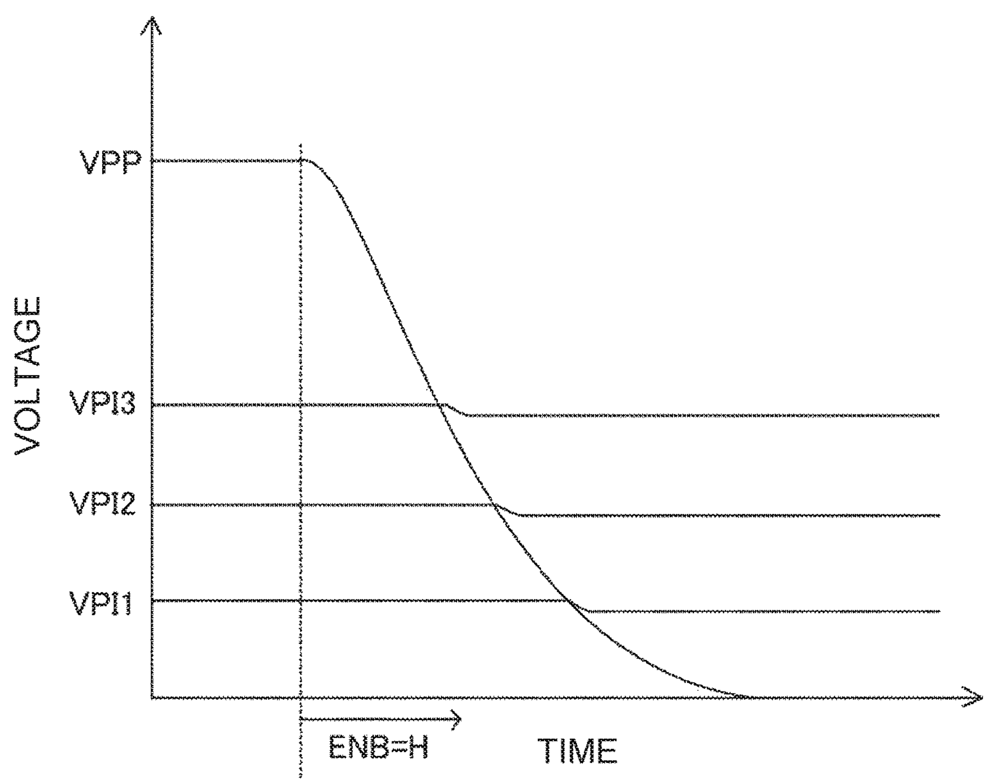
FIG. 9 is a diagram illustrating time-wise transitions of internal voltages during discharge operation in each charge pump circuit according to a comparative example.

FIG. 9 is a diagram illustrating time-wise transitions of internal voltages, which are the voltages arising at the node n1 of each of the charge pump circuits 11X according to the comparative example, during the discharge operation. In the boosting circuit according to the comparative example, the levels of the internal voltages VPI1, VPI2, VPI3, . . . , VPIn hardly change during the discharge operation. The potentials of the node n2 of each of the charge pump circuits 11X drop to ground level as the discharge operation progresses, such that the MOSFET 61 becomes OFF state and the charge accumulated in the capacitor 71 is not discharged.

In this manner, in the charge pump circuits 11X according to the comparative example, during the discharge operation the potentials of the nodes n2 drop to ground level, whereas the potentials of the nodes n1 hardly drop. Thus, the gate-to-source potential differences of the MOSFETs 61 and 62 exceed a range permissible for low withstand voltage transistors. Accordingly, in the charge pump circuits 11X according to the comparative example, the MOSFETs 61 and 62 need to be configured with high withstand voltage transistors.

However, in each of the charge pump circuits 11 according to the exemplary embodiment of the present disclosure, the MOSFET 63 provided between the node n1 and the node n2 function as the potential fixing circuit 60, and the potential Vn1 of the node n1 is fixed at a potential higher by the gate threshold value voltage VT of the MOSFET 63 than the potential of the potential Vn2 of the node n2. Thereby, in the present exemplary embodiment, the potential difference between the respective terminals of each of the MOSFETs 61 to 63 may be suppressed within a range permissible for low withstand voltage transistors, enabling the MOSFETs 61 to 63 to be configured by low withstand voltage transistors.

Figure 10:
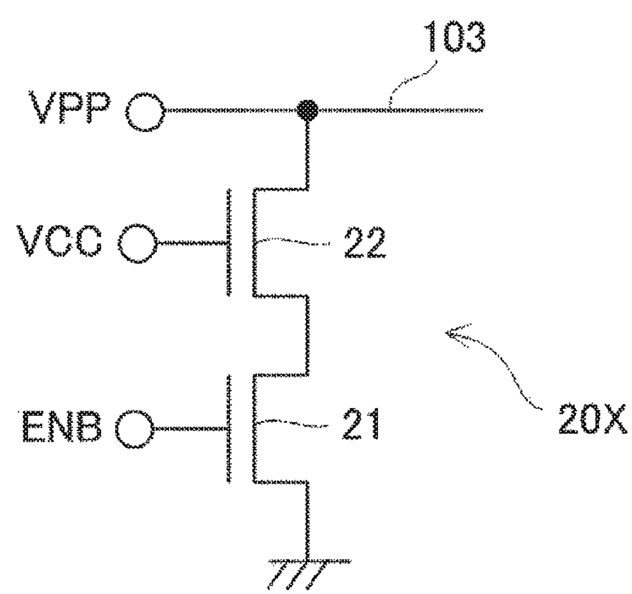
FIG. 10 is a circuit diagram illustrating a configuration of a discharge circuit according to a comparative example.

FIG. 10 is a circuit diagram illustrating a configuration of a discharge circuit 20X according to a comparative example. The discharge circuit 20X according to the comparative example is provided between an output line 103 and a ground line, and is configured by two MOSFETs 22 and 21 connected together in series.

In the discharge circuit 20X according to the comparative example, during the boosting operation, the source voltage of the MOSFET 22 is smaller than (VCC−VT), and so the drain voltage of the MOSFET 21 is also smaller than (VCC−VT). For example, in a case in which the MOSFET 22 were not provided, the gate-to-drain potential difference of the MOSFET 21 would then become VPP. However, the MOSFET 22, having the voltage VCC supplied to its gate, is connected to the high potential side of the MOSFET 21, and so the gate-to-drain potential difference of the MOSFET 21 is relaxed. However, in the discharge circuit 20X according to the comparative example, the gate-to-drain potential difference of the MOSFET 22 is (VPP−VCC), and so the MOSFET 22 needs to be configured by a high withstand voltage transistor that will withstand this potential difference.

On the other hand, in the discharge circuit 20 according to the exemplary embodiment of the present disclosure, the serially connected MOSFETs 23, 24, and 25 are provided at the high potential side of the MOSFET 22. The MOSFETs 23, 24, and 25 each have gates supplied with voltages that are higher in sequence down from the MOSFET connected at the high potential side. Thus the potential differences between the respective terminals of the MOSFETs 21 to 25 configuring the discharge circuit 20 are relaxed, enabling the potential differences to be suppressed within a range permissible for low withstand voltage transistors. Accordingly, the present exemplary embodiment may enable the MOSFETs 21 to 25 configuring the discharge circuit 20 to be configured by low withstand voltage transistors.

Moreover, in the discharge circuit 20 according to the exemplary embodiment of the present disclosure, the gates of the MOSFETs 23, 24, and 25 are respectively supplied with internal voltages of three mutually different charge pump circuits 11 as the control voltages VPIA, VPIB, and VPIC. Accordingly, the present exemplary embodiment may eliminate the need to provide a separate circuit to generate the control voltages VPIA, VPIB, and VPIC, and may enable the circuit scale of the boosting circuit 100 to be suppressed from increasing.

Second Exemplary Embodiment

Figure 11:
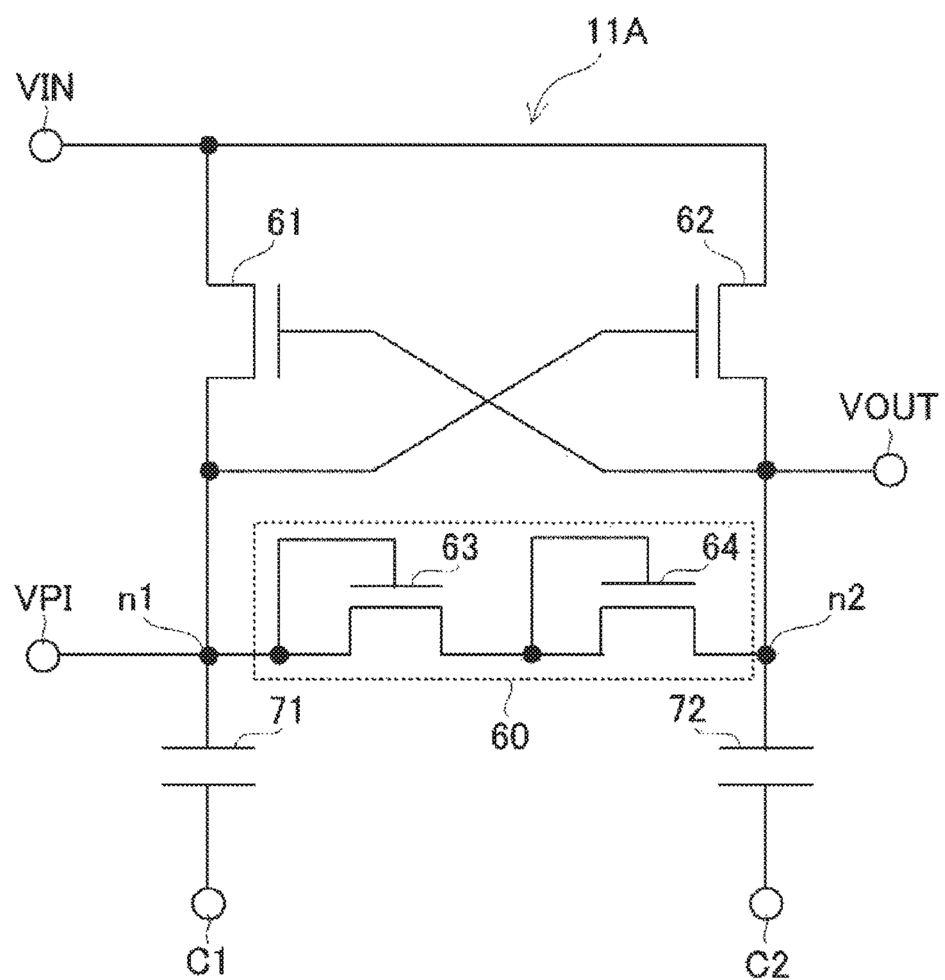
FIG. 11 is circuit diagram illustrating a configuration of a charge pump circuit according to another exemplary embodiment of the present disclosure.

FIG. 11 is a circuit diagram illustrating a configuration of a charge pump circuit 11A according to a second exemplary embodiment of the present disclosure. In the charge pump circuit 11A according to the second exemplary embodiment, a potential fixing circuit 60 is configured including n-channel MOSFETs 63 and 64.

The gate and the drain of the MOSFET 63 are connected to a node n1. The gate and the drain of the MOSFET 64 are connected to the source of the MOSFET 63. The source of the MOSFET 64 is connected to a node n2.

Figure 12:
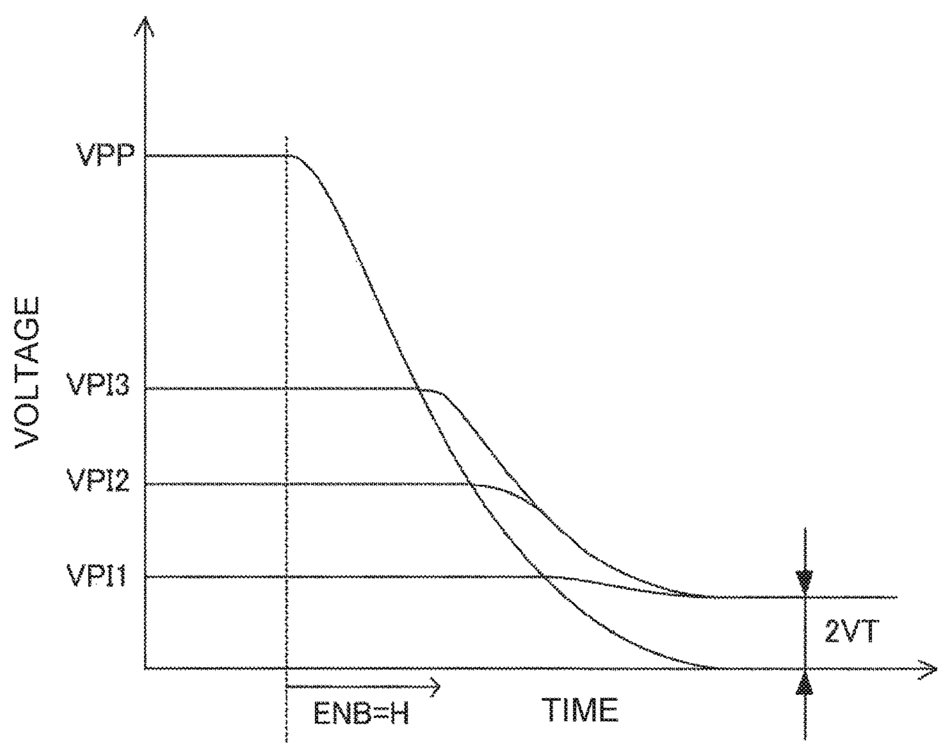
FIG. 12 is a diagram illustrating an example of time-wise transitions of internal voltages during discharge operation in a charge pump circuit according to another exemplary embodiment of the present disclosure.

FIG. 12 is a diagram illustrating an example of time-wise transitions of internal voltages during a discharge operation in each of respective charge pump circuits 11A in a boosting circuit including a boosting section configured by multi-stage-connected charge pump circuits 11A. In a case in which discharge operation is started and the levels of the voltages VPO1, VPO2, VPO3, . . . , VPP arising at the voltage output terminals VOUT (nodes n2) of the respective charge pump circuits 11A drop, the MOSFETs 64 and 63 of the respective charge pump circuits 11A sequentially become ON state. The potential Vn1 of each of the nodes n1 is thereby fixed at a potential higher by the amount 2VT than the potential of the potential Vn2 of each of the nodes n2. Thus, in a case in which the discharge operation has started, the internal voltages VPI1, VPI2, VPI3, . . . , VPIn, which are the voltages arising at the nodes n1 of the respective charge pump circuits 11A, are maintained in a state higher by the amount 2VT than the respective voltages VPO1, VPO2, VPO3, . . . , VPP, which are the voltages arising at the nodes n2. The internal voltages VPI1, VPI2, VPI3, . . . , VPIn drop accompany the drop in the voltages VPO1, VPO2, VPO3, . . . , VPP. Thus, during the discharge operation, the potential differences between the respective terminals of each of the MOSFETs 61, 62, 63, and 64, which configure the charge pump circuits 11A, become approximately 2VT, i.e. a magnitude permissible for low withstand voltage transistors.

In the charge pump circuits 11A according to the second exemplary embodiment, the potentials of the nodes n1 are maintained at 2VT or greater during the discharge operation. Namely, the level of the control voltages VPIA, VPIB, and VPIC supplied to the discharge circuit 20 during the discharge operation is maintained at 2VT or greater. This enables the MOSFETs 23 to 25 of the discharge circuit 20 to be reliably maintained in an ON state during the discharge operation, enabling the discharge operation in the discharge circuit 20 to be reliably performed.

Moreover, in the charge pump circuits 11A according to the second exemplary embodiment, the potentials of the nodes n1 are maintained at 2VT or greater during the boosting operation, and so, compared to the charge pump circuits 11 according to the first exemplary embodiment, the drive capability of the MOSFET 62 during the boosting operation may be enhanced, enabling the boosting operation to be realized with high efficiency.

Note that although in the present exemplary embodiment, the number of MOSFETs configuring the potential fixing circuit 60 is two, the potential fixing circuit 60 may be configured by three or more serially connected MOSFETs connected together by their respective gates and drains.

Third Exemplary Embodiment

Figure 13:
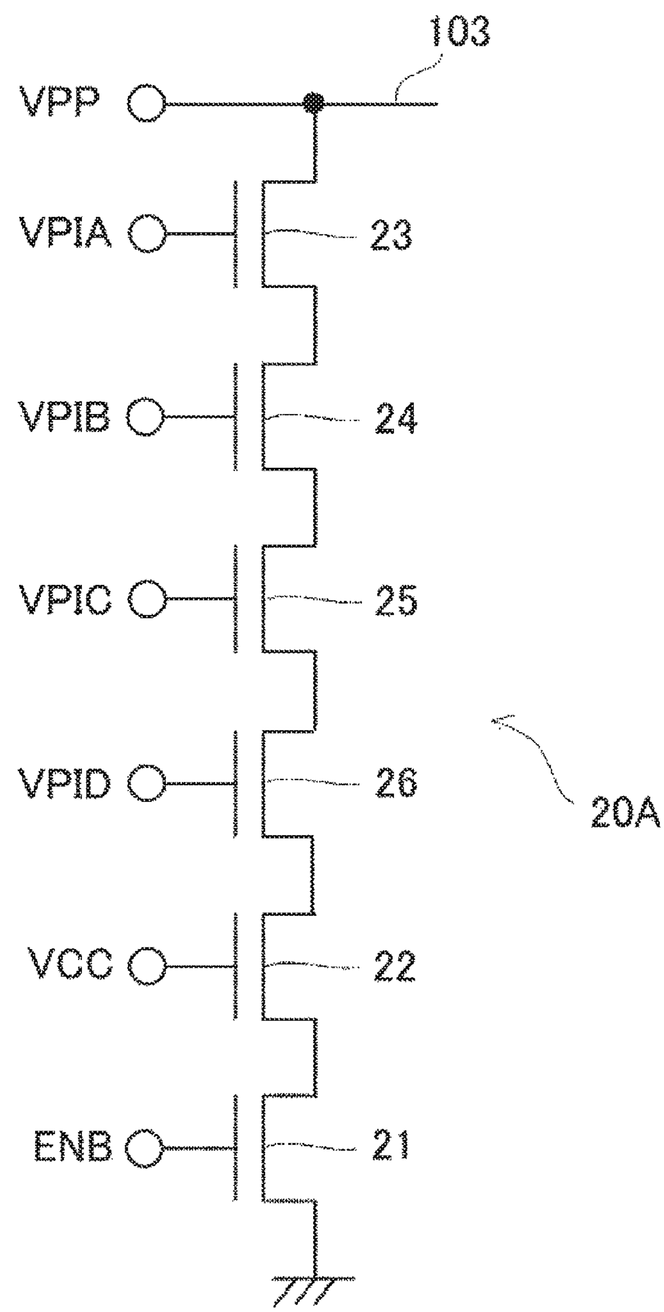
FIG. 13 is a circuit diagram illustrating a configuration of a discharge circuit according to another exemplary embodiment of the present disclosure.

FIG. 13 is a circuit diagram illustrating a configuration of a discharge circuit 20A according to a third exemplary embodiment of the present disclosure. The discharge circuit 20A according to the third exemplary embodiment is different from the discharge circuit 20 according to the first exemplary embodiment (see FIG. 4) in the point that an n-channel MOSFET 26 is additionally provided between the MOSFET 25 and the MOSFET 22. An internal voltage of the charge pump circuits 11 is supplied as the control voltage VPID to the gate of the MOSFET 26.

The voltages to be employed as the control voltages VPIA, VPIB, VPIC, and VPID are selected from out of the internal voltages VPI1, VPI2, VPI3, . . . , VPIn of the charge pump circuits 11 such that the control voltages VPIA, VPIB, VPIC, and VPID satisfy the relationship of Equation (4) below.

$$VCC<VPID<VPIC<VPIB<VPIA \quad (4)$$

Namely, in the MOSFETs 23, 24, 25 and 26, the MOSFETs 23, 24, 25, and 26 each have gates supplied, as the respective control voltages VPIA, VPIB, VPIC, VPID, with internal voltages of four mutually different charge pump circuits 11, such that voltages higher in sequence down from the MOSFET connected at the high potential side are supplied to the gates.

In the discharge circuit 20A according to the third exemplary embodiment of the present disclosure, due to the number of the MOSFETs that function as the voltage relaxation transistors being increased compared to the discharge circuit 20 according to the first exemplary embodiment, the voltage relaxation effect is enhanced, and the potential differences between the respective terminals of each of the respective MOSFETs configuring the discharge circuits 20A can be made smaller. Accordingly, the present exemplary embodiment may enable application to be made to a boosting circuit outputting a higher voltage.

Note that although in the exemplary embodiments described above, examples are given in which three or four MOSFETs are provided to function as voltage relaxation transistors at the high potential side of the MOSFET 22, there is no limitation to such embodiments. The number of MOSFETs provided at the high potential side of the MOSFET 22 may be one or two, or may be five or more, as long as the potential differences between the respective terminals of each of the respective MOSFETs configuring the discharge circuits are within a range permissible for low withstand voltage transistors.

Fourth Exemplary Embodiment

Figure 14:
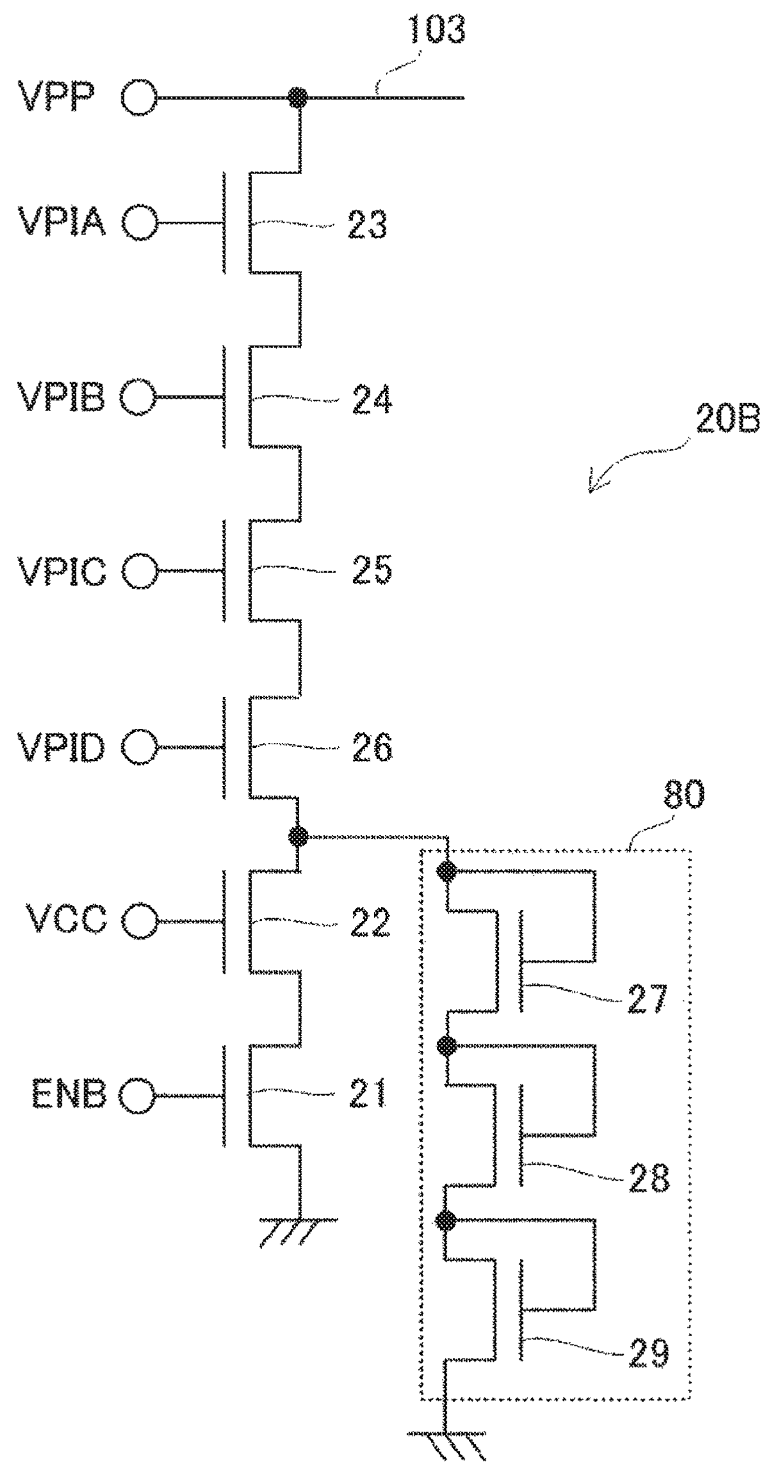
FIG. 14 is a circuit diagram illustrating a configuration of a discharge circuit according to another exemplary embodiment of the present disclosure.

FIG. 14 is a circuit diagram illustrating a configuration of a discharge circuit 20B according to a fourth exemplary embodiment of the present disclosure. The discharge circuit 20B according to the fourth exemplary embodiment differs from the discharge circuit 20A according to the third exemplary embodiment (see FIG. 13) in the point that a protection circuit 80 is included.

The protection circuit 80 is configured including n-channel MOSFETs 27, 28, and 29 connected together in series. The drain and gate of the MOSFET 27 are connected to the drain of the MOSFET 22. The drain and gate of the MOSFET 28 are connected to the source of the MOSFET 27. The drain and gate of the MOSFET 29 are connected to the source of the MOSFET 28. The source of the MOSFET 29 is connected to a ground line.

Control voltages VPIA, VPIB, VPIC, and VPID supplied to the discharge circuit 20B oscillate according to pulse signals C1A, C2A, C1B and C2B supplied to the boosting section 10. Accordingly, there is a possibility that the voltage level of the respective terminals of each of the MOSFETs 23 to 26 is higher than expected. During the boosting operation, if the level of the source voltage of the MOSFET 26 (the drain voltage of the MOSFET 22) becomes higher than expected due to the MOSFET 21 being in an OFF state, then this level is maintained until the start of the discharge operation. Thus, in cases in which there is no protection circuit 80, there is a possibility that the potential difference between the terminals of the MOSFET 22 exceed the withstand voltage thereof.

In the discharge circuit 20B according to the present exemplary embodiment, the MOSFETs 27, 28, and 29 become ON state in a case in which the level of the drain voltage of the MOSFET 22 reaches 3VT. This prevents the level of the drain voltage of the MOSFET 22 to exceed 3VT, and suppresses the potential difference between the terminals of the MOSFET 22 from exceeding a permissible range. Note that 3VT is a magnitude corresponding to the total of the gate threshold value voltages VT of the MOSFETs 27, 28, and 29.

Note that, in the first to the fourth exemplary embodiment, cases in which each of the MOSFETs configuring the charge pump circuit 11, 11A and the discharge circuit 20, 20A, 20B are configured by n-channel MOSFETs, have been described. However, these MOSFETs may be configured by p-channel MOSFETs. In cases in which these MOSFETs are configured by p-channel MOSFETs, the source of each of the MOSFETs is disposed at the high potential side, and the drain thereof is disposed at the low potential side.

What is claimed is:

1. A boosting circuit comprising a plurality of charge pump circuits in which a voltage output terminal of a prior stage charge pump circuit of the plurality of charge pump circuits is connected to a voltage input terminal of a next stage charge pump circuit of the plurality of charge pump circuits, each corresponding charge pump circuit of the plurality of charge pump circuits including comprising:

a first capacitor and a second capacitor to which a first pulse signal and a second pulse signal are respectively input;

a first transistor including a source connected to a voltage input terminal of the corresponding charge pump circuit, a drain connected to the first capacitor, and a gate connected to the second capacitor;

a second transistor including a source connected to the voltage input terminal of the corresponding charge pump circuit, a drain connected to the second capacitor, and a gate connected to the first capacitor; and a potential fixing circuit provided between a first node that is a connection node of the first transistor and the first capacitor, and a second node that is a connection node of the second transistor and the second capacitor, the potential fixing circuit configured to fix a potential of the first node to a potential according to a potential of the second node, wherein the voltage output terminal of the corresponding charge pump circuit is connected to the second node, wherein the boosting circuit further comprises a voltage dividing circuit connected to a voltage output terminal of a final stage charge pump circuit of the plurality of charge pump circuits, and including a plurality of capacitors connected together in series, a control circuit configured to control each of the plurality of charge pump circuits based on a voltage divided by the voltage dividing circuit; and a discharge circuit, connected to the voltage output terminal of the final stage charge pump circuit, configured to discharge charge accumulated in the plurality of capacitors of the voltage dividing circuit, and wherein the discharge circuit comprises a discharge transistor configured to be in an ON state in a case in which a discharge operation is performed in the discharge circuit, and at least one voltage relaxation transistor connected to a high potential side of the discharge transistor, and having a gate supplied with a voltage arising at the first node of one out of the plurality of charge pump circuits.

2. The boosting circuit of claim 1, wherein the potential fixing circuit comprises at least one transistor including a gate connected to a drain of the at least one transistor.

3. The boosting circuit of claim 1, wherein the potential fixing circuit comprises a plurality of transistors connected together in series, each of plurality of transistors including a gate connected to a drain thereof.

4. The boosting circuit of claim 1, wherein the at least one voltage relaxation transistor comprises a plurality of voltage relaxation transistors that are connected together in series at the high potential side of the discharge transistor, and in the plurality of charge pump circuits, gates of the plurality of voltage relaxation transistors are respectively supplied with voltages arising at the first nodes of mutually different charge pump circuits, such that the gates of each of the plurality of voltage relaxation transistors are supplied with voltages higher in sequence down from a voltage relaxing transistor of the plurality of voltage relaxation transistors connected at the high potential side of the discharge transistor.

5. The boosting circuit of claim 4, wherein the discharge circuit comprises a protection circuit configured to prevent a level of a terminal voltage of a voltage relaxation transistor connected to the discharge transistor from among the plurality of voltage relaxation transistors that is connected to the discharge circuit from exceeding a predetermined level.

* * * * *